United States Patent [19]

Doriguzzi et al.

[11] 4,106,859
[45] Aug. 15, 1978

[54] REFLECTOR WITH LIGHT-SCATTERING SURFACE FOR LIQUID-CRYSTAL DISPLAYS AND METHOD FOR THEIR MANUFACTURE

[75] Inventors: Rino Doriguzzi, Dottingen; Markus Egloff, Wettingen; Meinolph Kaufmann, Fislisbach; Jurgen Nehring, Umiken; Terry J. Scheffer, Wettingen, all of Switzerland

[73] Assignee: BBC Brown Boveri & Company Limited, Baden, Switzerland

[21] Appl. No.: 684,251

[22] Filed: May 7, 1976

[30] Foreign Application Priority Data

Jun. 27, 1975 [CH] Switzerland .................. 8375/75

[51] Int. Cl.² .................. C09K 3/34; G02F 1/01; C03C 17/00; B05D 3/12
[52] U.S. Cl. .................. 350/338; 65/31; 65/60 R; 65/60 C; 65/61; 65/62; 427/124; 427/290; 427/292; 427/331; 428/1; 428/141; 428/142; 428/161; 428/216
[58] Field of Search .................. 428/1, 142, 141, 161, 428/164, 216, 433, 434, 450, 463; 65/31, 60 R, 60 C, 61, 62; 350/160 LC; 427/124, 290, 292, 331

[56] References Cited

U.S. PATENT DOCUMENTS

| | | | |
|---|---|---|---|
| 2,993,806 | 7/1961 | Fisher et al. | 428/216 |
| 3,405,025 | 10/1968 | Goldman | 428/142 |
| 3,499,780 | 3/1970 | Etherington et al. | 428/450 |
| 3,616,098 | 10/1971 | Falls | 428/141 |
| 3,645,601 | 2/1972 | Doctoroff et al. | 428/433 |
| 3,687,713 | 8/1972 | Adams | 428/434 |
| 3,830,682 | 8/1974 | Rowland | 428/161 |
| 3,891,309 | 6/1975 | Bonne | 350/160 LC |
| 3,905,682 | 9/1975 | Meyerhofer | 350/160 LC |

OTHER PUBLICATIONS

IBM Technical Disclosure Bulletin vol. 15, No. 8, Jan. 1973, pp. 2435–2436.

*Primary Examiner*—William R. Dixon, Jr.
*Attorney, Agent, or Firm*—Oblon, Fisher, Spivak, McClelland & Maier

[57] ABSTRACT

A novel light scattering reflector and methods of making and using it are disclosed. The reflector, which can advantageously be used in conjunction with liquid crystal displays, includes a layer carrier formed of glass or rigid PVC foil. The layer carrier is roughened by sandblasting, impressing with a grooved die, or by other techniques to provide an irregular surface. A reflective metal coating is subsequently evaporated onto the roughened surface to complete the reflector structure. Auxiliary materials may also be coated onto the layer carrier to improve the characteristics of the device.

18 Claims, 15 Drawing Figures

REFLECTOR WITH LIGHT-SCATTERING SURFACE FOR LIQUID-CRYSTAL DISPLAYS AND METHOD FOR THEIR MANUFACTURE

BACKGROUND OF THE INVENTION

1. Field of the Invention

The invention relates to a reflector with a light-scattering surface for liquid-crystal displays operated in reflection, as well as to a method for the manufacture of such reflectors.

2. Description of the Prior Art

Reflectors of the type described are known for example from DT-OS 2,310,219. They consist of glass or plastics and are ground or sand-blasted on their front surface, while their other surface is provided with a highly reflective metal layer (possibly: aluminium, nickel or chromium).

From now abandoned U.S. patent application Ser. No. 610,753 filed Sept. 5, 1975 which is assigned to the assignee of this application there is also known a diffusely-scattering reflector, in which bronze paint is applied either to the surface of the polarizer turned away from the liquid crystal cell or upon a separate carrier.

In addition to these diffusely-reflecting reflectors there are also known reflectors for liquid crystal display devices which employ specular (i.e. mirror-like) reflection.

SUMMARY OF THE INVENTION

One object of the present invention is to provide a light scattering reflector for a liquid crystal display which is simple and economical to manufacture and which exhibits an optimal light diffusion characteristic which may be matched to a particular display element.

Another object of this invention is the provision of a novel method of producing such reflectors.

Briefly, these and other objects are achieved in accordance with the invention wherein a light scattering surface consisting of a highly reflective metal layer is produced and is applied to a layer carrier provided with depressions.

Thus, for example, the intensity of scattered light effective for the display with the novel reflectors is considerably greater than with diffusion-scattering reflectors with cosine characteristics, since in these the light is scattered through too great an angle and is strongly absorbed by the polarizers. As a result, with the employment of diffusely-scattering reflectors a considerable part of the incident light is absorbed in the display. Accordingly, display devices constructed with the new reflectors are characterized by high brightness and good readability. In addition the background reflection appearing with mirror-like reflection in planar reflectors is absent, as well as the limitation to very narrow viewing angles associated with these reflectors.

The manufacture of the novel reflectors is effected in accordance with the invention such that depressions are produced by roughening and subsequent etching of the surface of the layer carrier, or that they are impressed into the layer carrier with the help of a stamp or a roller.

BRIEF DESCRIPTION OF THE DRAWINGS

Further details of the novel reflectors as well as of the method for their manufacture are explained in the following detailed description when considered in connection with the accompanying drawings, wherein.

DESCRIPTION OF THE PREFERRED EMBODIMENTS

Figure 1A:
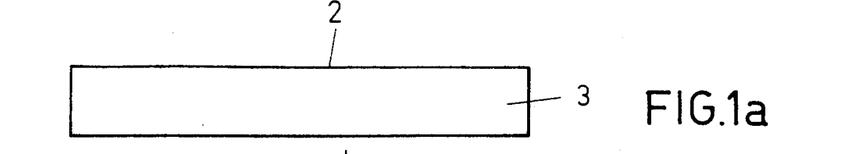
FIGS. 1a to 1f are schematic illustrations of the different steps in the method for the manufacture of the novel reflectors of the invention.
Figure 1B:
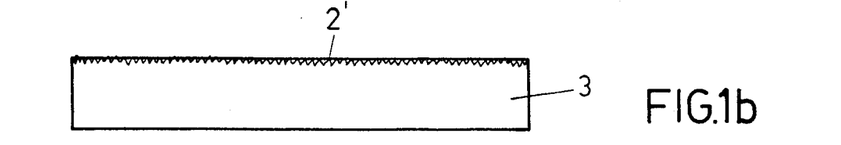
Figure 1C:
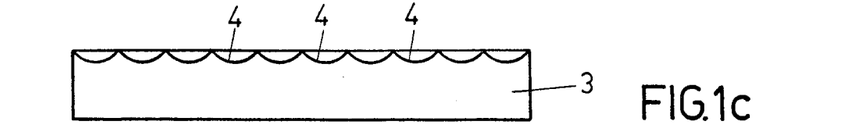
Figure 1D:
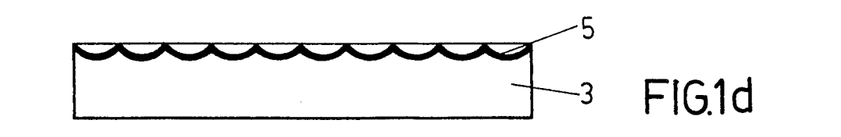
Figure 1E:
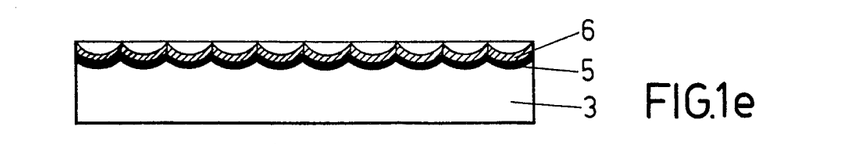
Figure 1F:
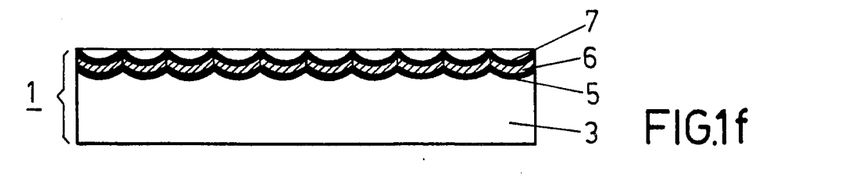

Referring now to the drawings, wherein like reference numerals designate identical or corresponding parts throughout the several views, and more particularly to FIGS. 1a to 1f, there are represented the different steps of the method for the manufacture of a novel reflector, especially suitable for use with liquid-crystal display devices, which is designated by 1 in FIG. 1f. For this purpose a major surface 2 of a substrate 3 (FIG. 1a), which in the present case may consist of a small glass plate of dimensions 20.0 × 9.4 × 0.4 mm. is subjected to a grinding operation until the glass plate has the desired thickness and its surface 2' has a uniformly roughened structure (FIG. 1b) caused by the grinding medium (a corresponding structure may be obtained by sand blasting the glass surface). Silicon-carbide powder of grain sizes 400, 800, 1000, or 1200 (such as is supplied by the Struers firm in Denmark) has proved particularly suitable. The grinding process itself especially in the mass-production of reflectors is preferably effected with the help of a lapping machine such as is employed in semiconductor technology for the lapping of silicon wafers. Less than 5 minutes are required in order to obtain a substantially uniformly roughened surface.

Following the grinding or sand-blasting operation the small glass plate is cleaned several times in distilled water, for example in an ultrasonic bath and finally immersed for 3 to 10 minutes in an etching bath, that preferably consists of a 1:1 mixture of $H_2O$ and HF, and moved to and fro in the acid.

Finally the thus treated glass plate is again rinsed with distilled water and then dried.

Figure 2:
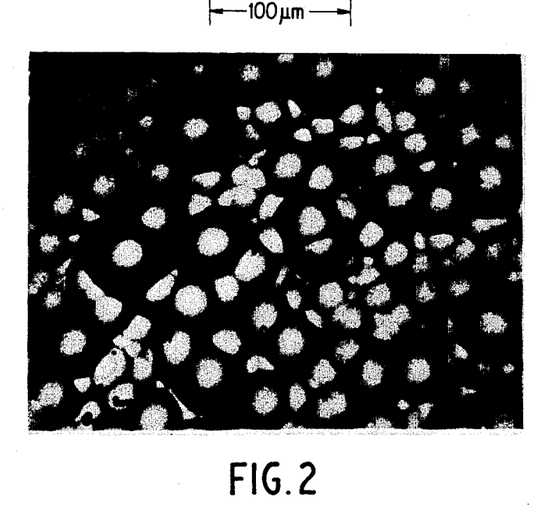
FIG. 2 is a photomicrograph of the surface of the novel reflector provided with depressions.

FIG. 2 shows a photomicrograph of such a surface after an etching time of 15 minutes. The bubble-like structure is characteristic of the etching process. Shorter etching times result in bubbles (depressions) of smaller diameters.

In FIG. 1c there is schematically represented a section of such a glass plate. The depressions 4 are here shown in an idealised form.

The highly reflective metal layer is applied upon the surface which has been etched and cleaned with water. In order to achieve a better attachment of this metal layer to the glass plate, it has proved to be advantageous first to evaporate upon the glass surface a chromium layer 5 (FIG. 1d) some 10 to 50Å thick and then to deposit upon this chromium layer 5 the reflective metal layer 6; which may for example consist of silver (FIG. 1e). For protection of the silver layer 6 against ambient influences, there is finally applied upon this layer a layer 7 of silicon dioxide about 250Å thick (FIG. 1f).

Figure 3:
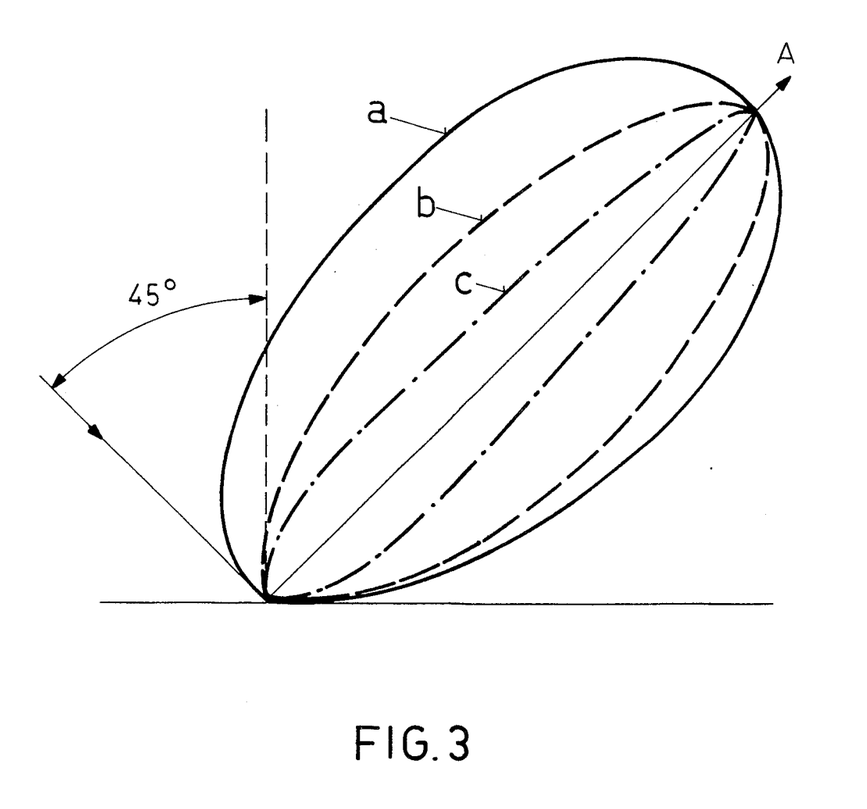
FIGS. 3 and 4 are graphical illustrations showing two diffusion characteristics of the reflectors in accordance with FIG. 1f for light incident at different angles.

FIG. 3 shows how the intensity of the reflected and scattered light (normalized to a maximum value of 1) varies in accordance with the angle of reflection, when measured in the plane of incidence of a parallel light bundle incident at 45° to the normal upon a glass plate ground with silicon carbide of grain No. 800. The curves a, b and c correspond to reflectors which were respectively etched for 0, 5, and 10 minutes. The longer the etching time, the narrower becomes the lobe characterizing the diffusion.

Figure 4:
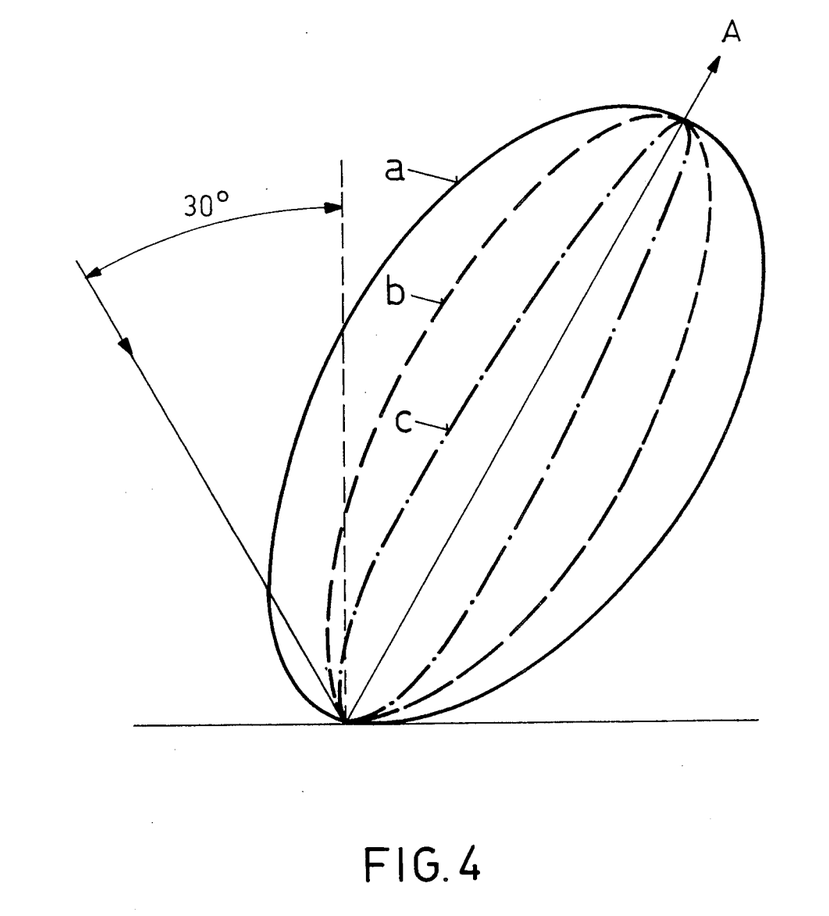

FIG. 4 shows corresponding test results for the same reflectors for a light beam incident at 30° to the normal.

By using the fine grained grinding powder of grade 1200, reflectors are obtained of which the dispersion-representing lobes for the longer etching times likewise become narrower.

Figure 5:
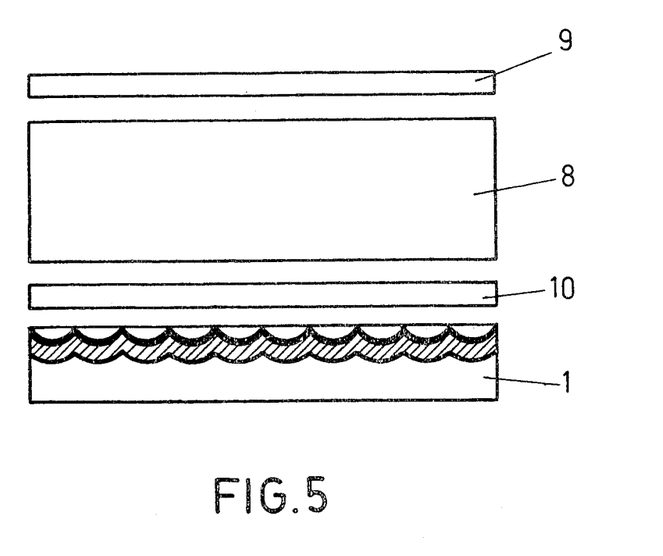
FIG. 5 is an illustration of a liquid crystal display device with a reflector of the type shown in FIG. 1f.

FIG. 5 shows schematically a liquid-crystal display device, in which the new reflector 1 is employed. The actual liquid-crystal cell 8 (which may in practice be a twisted cell) is situated between two polarizers 9, 10. The reflector 1, which is situated behind the polarizer 10 on the side remote from the liquid crystal cell 8, is either stuck directly to the polarizer 10 or is positioned behind the polarizer. Any epoxy cement of high quality (e.g. Lens Bond M 62) may be employed for adhesion.

The following TABLE gives in column 4 the total reflected radiant power in front of the display device for seven liquid crystal display devices, which differ only in the reflectors employed, of which the characteristic values are reproduced in columns 2 and 3. A disk smoked with MgO serves as a reference value. The measurements are effected with the help of a monochromatic light beam ($\lambda = 6328$ Å) incident on the polarizer 9 at 18.5° to the normal. The regular reflection at the surface of the polarizer 9 is already taken into account in the values given in Column 4 of TABLE 1.

TABLE 1

| Display No. | Grain No. | Etching Time | Totally Reflected Radiant Power |
| --- | --- | --- | --- |
| 1 | (layer of aluminium bronze applied by screen printing) | | 19.3% |
| 2 | 1200 | 3' 20" | 30.8% |
| 3 | 1200 | 4' 30" | 32.5% |
| 4 | 1200 | 6' | 33.3% |
| 5 | 1200 | 7' 30" | 35.2% |
| 6 | 1200 | 10' | 35.2% |
| 7 | 800 | 15' | 34.6% |
| MgO | — | — | 100.0% |

As may be taken from the TABLE, the effective radiant power of, for example, displays 5 and 6, is greater by 85.4% than that of the known display 1, that employs a reflector with a layer of aluminium bronze applied by screen printing.

Figure 6:
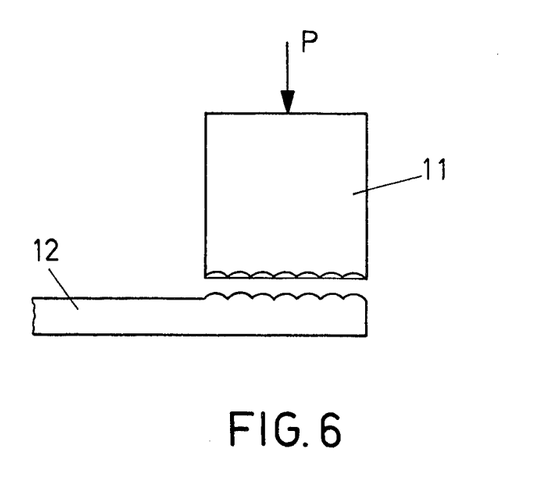
FIG. 6 is a schematic illustration of a first apparatus and technique for producing the desired surface depressions.

In FIG. 6 there is represented a method for the production of the depressions of the novel reflector that is particularly suitable for mass production. A glass plate 11, which in accordance with the present embodiment has been provided with a reflector structure, serves as a stamping die. Under pressure and heat (about 120° C) the reflector structure is impressed into a hard PVC foil 12 about 0.2 mm thick. After evaporation with a thin metal layer there is thus obtained a thin, flexible reflector which may very readily be formed by cutting or stamping into any desired shape, and which exhibits the same dispersion characteristics as the glass plate provided with the reflector structure.

Figure 7A:
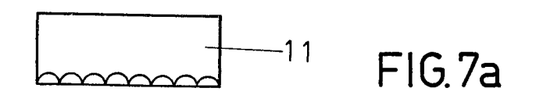
FIGS. 7a, 7b and 7c are schematic illustrations of a second apparatus and technique for producing the desired surface depressions.
Figure 7B:
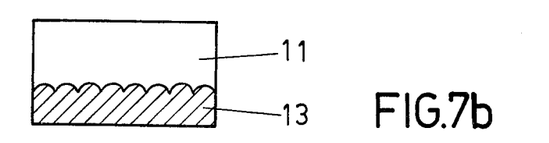
Figure 7C:
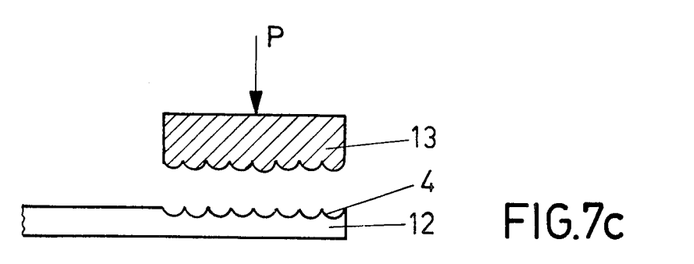

FIG. 7 shows a method for the manufacture of reflectors that exhibit the same (positive) structure as the glass plate 11 (FIG. 6 and FIG. 7a). For this purpose the glass plate is made conductive by chemical silver flashing and thereafter thickened by electrotyping (FIG. 7b). There thus results what is called a master matrix (negative) 13 of high mechanical strength, which is readily released from the glass plate 11. Afterwards its structure is impressed with this matrix 13 into the hard PVC foil 12 at a raised temperature (some 120° C) and under pressure (FIG. 7c). The foil to be impressed is, after pressing, advanced by a stamp width and rolled up again. The whole roll of foil, thus impressed, is then, in passing through a high vacuum evaporating apparatus, evaporated with aluminium, for example. These reflector foils can afterwards be laminated with a polarizing foil coated with an adhesive, or else be divided by stamping or cutting into pieces of appropriate size.

Figure 8:
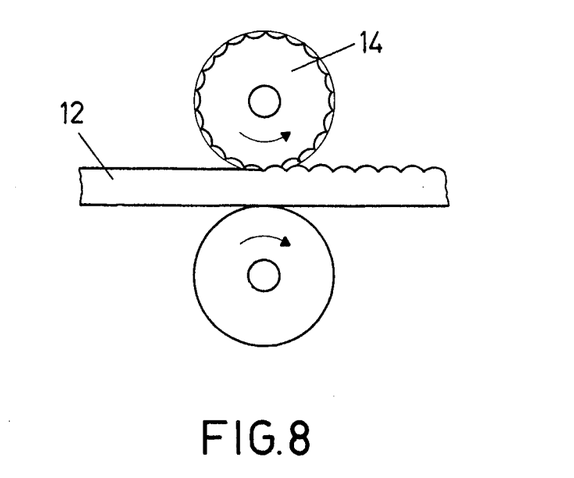
FIG. 8 is a schematic illustration of a third apparatus and technique for producing the desired surface depressions.

In addition to the stamping of a separate reflector foil 12 the rear side of the polarizer 10 (FIG. 5) can also be provided with the desired reflector structure by the described method. Additionally it may be advantageous for mass-production to employ instead of an impressing stamp 11 (FIG. 6) or 13 (FIG. 7c) a roller 14 (FIG. 8), which exhibits the corresponding reflector structure.

For liquid-crystal displays, which are to be employed both in daytime and also in the night (wrist-watches) the use of semi-transparent, diffuse metal reflectors has proved especially advantageous. In night-time operation, a light source that is situated at the rear of the reflector, supplies the necessary illumination.

Such reflectors are obtained if the reflecting metal layers (Al, Ag, Au or Cu) on the foils or glass plates provided with the reflector structure are evaporated sufficiently thinly. Such layers then have exactly the required characteristics: diffuse, polarization-retaining reflection in the reflection mode and transmission with rear illumination. The magnitude of the transmission and the reduction of the reflection as compared with a nontransmissive reflector depends upon the layer thickenss of the evaporated metal layer. For a silver layer of 200 Å the transmission amounts, for example, to some 20%. To still obtain sufficient reflection, the transmission of the reflectors should lie between 20 and 50% and correspondingly the layer thickness of the reflective silver of aluminium layer between 100 and 400 Å. Instead of on glass plates, the reflective metal layers may also be disposed on the roughened rear side of the back polarizer.

In addition to the foregoing the following preferred dimensional ranges are noted:
Chromium Layer—between 10 and 100 Å thick
Reflective Layer—between 400 and 1000 Å thick
SiO$_2$ Protective Layer—between 100 and 1000 Å thick.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal display device comprising a twisted nematic liquid electro-optical crystal cell and a reflector, the reflector comprising a layer carrier provided with depressions of bubble-like structure and a thin, compared to the depth of the depressions, highly reflective layer applied upon the depression-comprising surface of the layer carrier, the layer carrier comprising a material selected from the group consisting of glass, plastic and metal and the reflective layer comprising a metal selected from the group consisting of silver, aluminum, gold and copper.

2. A liquid crystal display device as in claim 1 further comprising a polarizer disposed between the reflector and the twisted nematic liquid electro-optical crystal cell.

3. A liquid crystal display device as in claim 2 wherein the surface of the polarizer facing away from the twisted nematic liquid electro-optical crystal cell is utilized as the layer carrier.

4. A reflector with a light-scattering surface of liquid crystal displays operated in reflection, comprising:
 a layer carrier provided with depressions of bubble-like structure and a thin, compared to the depth of the depressions, highly reflective layer applied upon the depression-comprising surface of the layer carrier,
 the layer carrier comprising a material selected from the group consisting of glass, plastic and metal and the reflective layer comprising a metal selected from the group consisting of silver, aluminum, gold and copper.

5. A reflector in accordance with claim 4, further comprising:
 a chromium layer situated between said reflective layer and said layer carrier and,
 a protective $SiO_2$ layer placed on said reflective layer.

6. A reflector in accordance with claim 5, wherein:
 said chromium layer is between 10 and 100 Å thick, said reflective layer is between 400 and 1000 Å thick and said $SiO_2$ protective layer is between 100 and 1000 Å thick.

7. A reflector in accordance with claim 4, wherein: said reflective metal layer consists of a silver layer 100–400 Å thick.

8. A reflector in accordance with claim 4, wherein: said reflective metal layer consists of an aluminium layer 100–400 Å thick.

9. A method for the manufacture of a reflector with a light-scattering surface for liquid crystal displays operated in reflection having a layer carrier comprising a material selected from the group consisting of glass, plastic and metal provided with depressions and having a thin highly reflective layer comprising a metal selected from the group consisting of silver, aluminum, gold and copper evaporated upon the depression-provided surface of the layer carrier comprising the steps of: generating depressions by roughening and subsequently etching the surface of the layer carrier and evaporating said metal on said surface.

10. A method as in claim 9, wherein:
 said step of roughening is carried out by using an SiC grinding medium having a grain number between 400 and 1200.

11. A method as in claim 9, wherein:
 said step of roughening is carried out by sand blasting.

12. A method as in claim 9, wherein:
 said step of etching is carried out using a 1:1 mixture of distilled water and hydrofluoric acid.

13. A method for manufacturing a reflector with a light-scattering surface for liquid crystal displays operated in reflection having a layer carrier comprising a material selected from the group consisting of glass, plastic and metal provided with depressions and having a thin highly reflective layer comprising a metal selected from the group consisting of silver, aluminum, gold and copper applied upon the depression-provided surface of the layer carrier comprising the steps of generating depressions in the layer carrier by impressing the layer carrier with a stamping device and evaporating the thin highly reflective metal layer in a high vacuum.

14. A method as in claim 13, wherein:
 said step of impressing is carried out using a roughened glass plate.

15. A method as in claim 14, further comprising the step of:
 using a rigid PVC foil as said layer carrier; and,
 evaporating said highly reflective metal layer on said layer carrier.

16. A method as in claim 13, wherein:
 said step of impressing is carried out using a negative manufactured by electrotyping a roughened glass plate.

17. A method as in claim 13, further comprising the steps of:
 using a glass plate as said layer carrier; and,
 successively applying on said glass plate chromium, reflective metal and $SiO_2$ layers.

18. A method for manufacturing a reflector with a light-scattering surface for liquid crystal displays operated in reflection having a layer carrier comprising a material selected from the group consisting of glass, plastic and metal provided with depressions and having a thin highly reflective layer comprising a metal selected from the group consisting of silver, aluminum, gold and copper applied upon the depression-provided surface of the layer carrier comprising the steps of applying a highly reflective metal layer on the layer carrier and generating depressions in the highly reflective metal layer and in the layer carrier by impressing the highly reflective metal layer and the layer carrier with a stamping device.

* * * * *